United States Patent
Li et al.

(10) Patent No.: US 11,609,096 B2
(45) Date of Patent: Mar. 21, 2023

(54) METHOD AND APPARATUS FOR UPDATING ROAD NETWORK DATA

(71) Applicant: Beijing Baidu Netcom Science and Technology Co., Ltd., Beijing (CN)

(72) Inventors: Bing Li, Beijing (CN); Zhipeng Zhou, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 169 days.

(21) Appl. No.: 17/038,516

(22) Filed: Sep. 30, 2020

(65) Prior Publication Data

US 2021/0356278 A1 Nov. 18, 2021

(30) Foreign Application Priority Data

May 14, 2020 (CN) .......................... 202010407549.8

(51) Int. Cl.
*G01C 21/32* (2006.01)
*G06F 16/29* (2019.01)
*G01C 21/34* (2006.01)

(52) U.S. Cl.
CPC .......... *G01C 21/32* (2013.01); *G01C 21/343* (2013.01); *G06F 16/29* (2019.01)

(58) Field of Classification Search
CPC .. G01C 21/32; G01C 21/343; G01C 21/3844; G01C 21/3859; G01C 21/3841; G06F 16/29; G06F 16/23
See application file for complete search history.

(56) References Cited

U.S. PATENT DOCUMENTS

| 6,154,152 A * | 11/2000 | Ito ................... G08G 1/096811 340/988 |
| 2006/0217879 A1* | 9/2006 | Ikeuchi ................ G01C 21/32 701/409 |
| 2015/0198450 A1* | 7/2015 | Davidson ............. G01C 21/32 701/533 |

(Continued)

FOREIGN PATENT DOCUMENTS

| CN | 104050237 A | 9/2014 | |
| CN | 104121917 A * | 10/2014 | ............ G01C 21/32 |
| CN | 104121917 A | 10/2014 | |

(Continued)

OTHER PUBLICATIONS

CN104121917A English Translation.*

(Continued)

*Primary Examiner* — Rami Khatib
*Assistant Examiner* — Gabriel Joseph Rene Lambert
(74) *Attorney, Agent, or Firm* — Quinn IP Law (57) ABSTRACT

The present disclosure provides a method and an apparatus for updating road network data. The method for updating the road network data is specifically implemented as follows: acquiring trajectory data reported by a terminal; determining a plurality of out-of-road trajectories within a preset area coverage according to the trajectory data; determining a fitting trajectory according to the plurality of out-of-road trajectories; and updating existing first road network data according to the fitting trajectory to acquire second road network data.

9 Claims, 2 Drawing Sheets

(56) References Cited

U.S. PATENT DOCUMENTS

2016/0091324 A1* 3/2016 Horihata .......... G08G 1/096811
　　　　　　　　　　　　　　　　　　　　701/417
2017/0010109 A1* 1/2017 Hayon ................ B60W 30/10

FOREIGN PATENT DOCUMENTS

| CN | 106840176 A | 6/2017 |
| CN | 107871400 A | 4/2018 |
| CN | 109241069 A | 1/2019 |
| DE | 10030932 A1 | 1/2002 |
| DE | 10230104 A1 | 1/2004 |
| JP | 2010197083 A | 9/2010 |
| JP | 2018189990 A | 11/2018 |

OTHER PUBLICATIONS

The extended European search report for European application No. EP 21150027, dated Jul. 6, 2021.
First Chinese Office Action for CN application No. CN202010407549.8, dated Mar. 22, 2022.
Second Chinese Office Action for an application No. CN202010407549.8, dated Jun. 1, 2022.
Guo Sen et al., "GIS map updating algorithm based on new road finding", Journal of Computer Applications, ISSN 1001-9081, Jilin University, Changchun Jilin, China, Sep. 10, 2016.
"Comprehensive surveying and mapping capabilities", Analysis of test sites and analysis of test questions 2019 edition, May 26, 2022.
Office Action issued in JP Application No. 2020-191389 dated Oct. 18, 2022.

* cited by examiner

METHOD AND APPARATUS FOR UPDATING ROAD NETWORK DATA

CROSS-REFERENCE TO RELATED APPLICATION

This application claims a priority to Chinese Patent Application No. 202010407549.8 filed in China on May 14, 2020, the disclosure of which is incorporated herein in its entirety by reference.

TECHNICAL FIELD

The present disclosure relates to a navigation technology in the technical field of computers, in particular to a method and an apparatus for updating road network data.

BACKGROUND

In a map navigation, road network data is one of the most basic data. Due to the rapid development of urban construction, it often happens that the road network data remains not updated in a case that roads have been changed.

SUMMARY

In a first aspect of the present disclosure, a method for updating road network data is provided, including: acquiring trajectory data reported by a terminal; determining a plurality of out-of-road trajectories within a preset area coverage according to the trajectory data; determining a fitting trajectory according to the plurality of out-of-road trajectories; and updating existing first road network data according to the fit trajectory to acquire second road network data.

Further, the updating existing first road network data according to the fitting trajectory to acquire second road network data, includes: performing matching on the fitting trajectory and roads in the first road network data; in a case that there is no match between the fitting trajectory and the roads in the first road network data, acquiring a first road point and a second road point in the first road network data, the first road point being a first road point in the first road network data which fails to match the fitting trajectory in a first direction, the second road point being a first road point in the first road network data which matches the fitting trajectory in the first direction, the first direction being a direction from a first end to a second end of the fitting trajectory; and updating the first road network data according to the first road point, the second road point and the fitting trajectory to acquire the second road network data.

Further, the performing matching on the fitting trajectory and roads in the first road network data, includes: performing matching on the fitting trajectory and the roads in the first road network data in terms of direction; and/or, performing matching on the fitting trajectory and the roads in the first road network data in terms of location; and/or, performing matching on the fitting trajectory and the roads in the first road network data in terms of shape.

Further, the method further includes: acquiring a point of information POI in the preset area coverage; determining whether the fitting trajectory is within a parking lot area or an internal road area according to the POI; and in a case that the fitting trajectory is not within the parking lot area or the internal road area, performing the matching on the fitting trajectory and the roads in the first road network data.

Further, the determining a fitting trajectory according to the plurality of out-of-road trajectories, includes: performing matching on each out-of-road trajectory in the plurality of out-of-road trajectories to one another to acquire a plurality of match values; determining the out-of-road trajectories corresponding to match values greater than a preset match threshold in the plurality of match values as similar trajectories; and in a case that the number of the similar trajectories is greater than a preset number threshold, fitting the out-of-road trajectories corresponding to the similar trajectories to acquire the fitting trajectory.

In a second aspect of the present disclosure, an apparatus for updating road network data is provided, including: a first acquisition module, configured to acquire trajectory data reported by a terminal; a first determination module, configured to determine a plurality of out-of-road trajectories within a preset area coverage according to the trajectory data; a second determination module, configured to determine a fitting trajectory according to the plurality of out-of-road trajectories; and a second acquisition module, configured to update existing first road network data according to the fitting trajectory to acquire second road network data.

Further, the second acquisition module includes: a first matching submodule, configured to perform matching on the fitting trajectory and roads in the first road network data; a first acquisition submodule, configured to, in a case that there is no match between the fitting trajectory and the roads in the first road network data, acquire a first road point and a second road point in the first road network data, the first road point being a first road point in the first road network data which fails to match the fitting trajectory in a first direction, the second road point being a first road point in the first road network data which matches the fitting trajectory in the first direction, the first direction being a direction from a first end to a second end of the fitting trajectory; and an update submodule, configured to update the first road network data according to the first road point, the second road point and the fitting trajectory to acquire the second road network data.

Further, the first matching submodule is configured to: perform matching on the fitting trajectory and the roads in the first road network data in terms of direction; and/or, perform matching on the fitting trajectory and the roads in the first road network data in terms of location; and/or, perform matching on the fitting trajectory and the roads in the first road network data in terms of shape.

Further, the apparatus further includes: a third acquisition module, configured to acquire a point of information POI in the preset area coverage; a third determination module, configured to determine whether the fitting trajectory is within a parking lot area or an internal road area according to the POI; and a trigger module, configured to, in a case that the fitting trajectory is not within the parking lot area or the internal road area, trigger the first matching submodule to operate.

Further, the second determination module includes: a second acquisition submodule, configured to perform matching on each out-of-road trajectory in the plurality of out-of-road trajectories to one another to acquire a plurality of match values; a determination submodule, configured to determine the out-of-road trajectories, corresponding to match values greater than a preset match threshold in the plurality of match values, as similar trajectories; and a third acquisition submodule, configured to, in a case that the number of the similar trajectories is greater than a preset number threshold, fit the out-of-road trajectories corresponding to the similar trajectories to acquire the fitting trajectory.

In a third aspect of the present disclosure, an electronic device is provided, including: at least one processor; and a memory in communication connection with the at least one processor; where the memory has stored thereon instructions executable by the at least one processor, and the instructions, in a case that executed by the at least one processor, cause the at least one processor to perform the method described in the first aspect.

In a fourth aspect of the present disclosure, a non-transitory computer-readable storage medium having stored thereon instructions executable by a computer for causing the computer to perform the method described in the first aspect is provided.

BRIEF DESCRIPTION OF THE DRAWINGS

Drawings are included to provide a better understanding of the present disclosure and are not to be construed as limiting the present disclosure, in which.

DETAILED DESCRIPTION

Exemplary embodiments of the present disclosure are described below in conjunction with the drawings, including various details of embodiments of the present disclosure to facilitate understanding, which are to be considered merely exemplary. Accordingly, one of ordinary skill in the art should appreciate that various changes and modifications may be made to the embodiments described herein without departing from the scope and spirit of the present disclosure. Also, descriptions of well-known functions and structures are omitted from the following description for clarity and conciseness.

Figure 1:
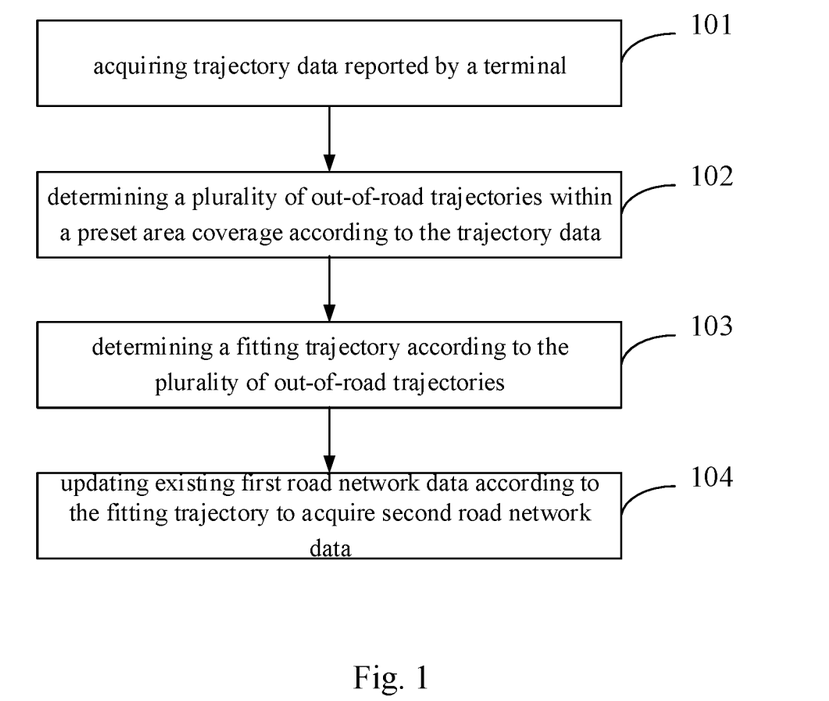
FIG. 1 is a flow chart of a method for updating road network data according to an embodiment of the present disclosure.

Referring to FIG. 1, FIG. 1 is a flow chart of a method for updating road network data according to an embodiment of the present disclosure. As shown in FIG. 1, the method for updating road network data in this embodiment is applied to an electronic device, including the following steps.

Step 101, acquiring trajectory data reported by a terminal.

The terminal may be a vehicle-mounted terminal arranged in a vehicle, and the vehicle-mounted terminal reports trajectory data of the vehicle to the electronic device during travel of the vehicle. The electronic device may be a server for updating road network data according to the trajectory data reported by the terminal.

Step 102, determining a plurality of out-of-road trajectories within a preset area coverage according to the trajectory data.

The preset area coverage may be set in advance. For example, area blocks are defined with longitude and latitude coordinates, and each area block is an area of n*n, where n may be set according to practical conditions, for example, n may be 300 meters. The preset area coverage may be one area block that has been defined.

A plurality of trajectories may be determined according to the trajectory data, and an out-of-road trajectory may be understood as a trajectory in the plurality of trajectories which fails to match any road in the existing first road network data. Specifically, in the determination of the plurality of out-of-road trajectories within the preset area coverage, for a first trajectory in the plurality of trajectories determined according to the trajectory data, a first area block where the first trajectory is located is determined firstly, then matching is performed on the first trajectory and roads within the first area block in the first road network data, and in a case that there is no match, the first trajectory is determined as an out-of-road trajectory, otherwise the first trajectory is determined as a non-out-of-road trajectory.

Step 103, determining a fitting trajectory according to the plurality of out-of-road trajectories.

The plurality of out-of-road trajectories are fitted, for example, by using a least square method to acquire a fitting trajectory, i.e. a new trajectory.

Step 104, updating existing first road network data according to the fitting trajectory to acquire second road network data.

The first road network data is updated with the fitting trajectory to acquire the second road network data, and the update of the first road network data described above may be based on real vehicle trajectory data reported by a number of terminals, so that a resource of massive trajectory data may be acquired, and data is acquired without manual work in the update of the first road network data, thereby improving the efficiency. In addition, as the update is based on the trajectory data uploaded by the terminal, the acquisition of the trajectory data is quick and convenient, so that the update cycle of the first road network data may be shortened, and map update based on the updated second road network data is further facilitated.

In this embodiment, trajectory data reported by a terminal is acquired; a plurality of out-of-road trajectories within a preset area coverage are determined according to the trajectory data; a fitting trajectory is determined according to the plurality of out-of-road trajectories; and existing first road network data is updated according to the fitting trajectory to acquire second road network data. The existing first road network data is updated as described above involving no manual work, so that the efficiency of the update of the first road network data is improved.

In an embodiment of the present disclosure, the updating existing first road network data according to the fitting trajectory to acquire second road network data, includes: performing matching on the fitting trajectory and roads in the first road network data; in a case that there is no match between the fitting trajectory and the roads in the first road network data, acquiring a first road point and a second road point in the first road network data, the first road point being a first road point in the first road network data which fails to match the fitting trajectory in a first direction, the second road point being a first road point in the first road network data which matches the fitting trajectory in the first direction, the first direction being a direction from a first end to a second end of the fitting trajectory; and updating the first road network data according to the first road point, the second road point and the fitting trajectory to acquire the second road network data.

In this embodiment, in a case that matching is to be performed on the fitting trajectory and roads in the first road network data, i.e., in a case that matching is performed on the fitting trajectory and roads in the first road network data within the preset area coverage, the matching may be performed in the following ways. That is, the performing matching on the fitting trajectory and a road in the first road network data, includes: performing matching on the fitting trajectory and the roads in the first road network data in terms of direction; and/or, performing matching on the fitting trajectory and the roads in the first road network data in terms of location; and/or, performing matching on the fitting trajectory and the roads in the first road network data in terms of shape. The matching is performed on the fitting trajectory and the roads in the first road network data in terms of at least one of direction, location, and shape to determine whether there is a match between the fitting trajectory and the roads in the first road network data. The matching is performed on the fitting trajectory and the roads in the first road network data to determine whether the fitting trajectory is a new trajectory, so that the first road network data may be updated in accordance with the determined new trajectory, thereby improving the efficiency of the update of the first road network data.

In a case that the first road network data includes a road matching the fitting trajectory, it means that the matching is successful, and the fitting trajectory is an existing trajectory in the first road network data. In a case that there is no road in the first road network data matching the fitting trajectory, it means that the matching is failed, and the fitting trajectory is a new trajectory and needs to be added into the first road network data.

In a case that there is no match between the fitting trajectory and the roads in the first road network data, a first road point and a second road point in the first road network data are acquired, the first road point is a first road point in the first road network data which fails to match the fitting trajectory in a first direction. The vehicle starts to travel from a first existing road, then travels to a new road, and finally returns to a second existing road. The first existing road and the second existing road may be the same or different. A road section between two ends of the fitting trajectory matches a road existing in the first road network data, while a road section in the middle of the fitting trajectory is a new road section. In this case, it is necessary to determine a first road point in the first road network data which fails to match the fitting trajectory in the first direction, i.e., the first road point, and to determine a first road point in the first road network data which matches the fitting trajectory in the first direction, i.e., the second road point. The first road point and the second road point may be considered as bifurcation points of the fitting trajectory from the existing roads in the first network data. A road section in the first road network data may be formed by two road points (i.e. link points) each corresponding to a unique identifier. The first road point and the second road point also have respective unique identifiers thereof. To determine the first road point and the second road point may be considered to acquire the unique identifier of the first road point and the unique identifier of the second road point.

This embodiment also provides a scenario where the vehicle starts to travel from a first existing road, then travels onto a new road, and finally does not return to a second existing road. In this case, the first end of the fitting trajectory is located on an existing road in the first road network data, while the second end is not located on an existing road in the first road network data. Then a first road point in the first road network data which fails to match the fitting trajectory in the first direction is determined as the first road point, and a point where the second end of the fitting trajectory is located is taken as the second road point.

After the first road point and the second road point are determined, the first road network data is updated according to the first road point, the second road point and the fitting trajectory to acquire the second road network data.

In this embodiment, in a case that there is no match between the fitting trajectory and the roads in the first road network data, the first road point and the second road point in the first road network data are determined according to the relationship between the fitting trajectory and the roads in the first road network data, and then the first road network data is updated according to the first road point, the second road point and the fitting trajectory, so that the whole process of the update of the first road network involves no manual work, thereby improving the efficiency of update.

In an embodiment of the present disclosure, subsequent to the determining a fitting trajectory according to the plurality of out-of-road trajectories, and prior to performing matching on the fitting trajectory and roads in the first road network data, the method further includes: acquiring a point of information POI in the preset area coverage; determining whether the fitting trajectory is within a parking lot area or an internal road area according to the POI; and in a case that the fitting trajectory is not within a parking lot area or an internal road area, performing the matching on the fitting trajectory and the roads in the first road network data.

In this embodiment, after the fitting trajectory is determined, the matching on the fitting trajectory and the roads in the first road network data is not performed immediately. It is determined that whether the fitting trajectory belongs to a parking lot area or an internal road area first, and in a case that the fitting trajectory belongs to the parking lot area or the internal road area, the first road network data is not to be updated.

In a geographic information system, a Point of Information (POI) may be a house, a shop, a post, a bus station, etc. Each POI includes information in four aspects, i.e. name, category, coordinate and type. Comprehensive information of POIs is necessary for enriching a navigation map, and timely information of POIs may remind a user of branches of roads and detailed information of surrounding buildings, which may facilitate a navigation to search various places required by the user, and choose a most convenient and unobstructed road for path planning. The number of POIs in the navigation map directly affects the ease of the navigation.

In this embodiment, a point of information POI within a preset area coverage is firstly acquired, and then whether the fitting trajectory is within a parking lot area or an internal road area is determined according to the POI. In a case that the fitting trajectory is not within the parking lot area or the internal road area, the matching on the fitting trajectory and the roads in the first road network data is performed. In this way, matching is performed on the fitting trajectory and the roads in the first road network data to update the first road network data only in a case that the fitting trajectory is not within the parking lot area or the internal road area. The whole process described above involves no manual work so that the efficiency of the update of the first road network data is improved.

In an embodiment of the present disclosure, the determining a fitting trajectory according to the plurality of out-of-road trajectories, includes: performing matching on each out-of-road trajectory in the plurality of out-of-road trajectories to one another to acquire a plurality of match values; determining the out-of-road trajectories, corresponding to match values greater than a preset match threshold in the plurality of match values, as similar trajectories; and in a case that the number of the similar trajectories is greater than a preset number threshold, fitting the out-of-road trajectories corresponding to the similar trajectories to acquire the fitting trajectory.

In this embodiment, matching is performed on each out-of-road trajectory in the plurality of out-of-road trajectories to one another to acquire a plurality of match values, for example, in a case that there are three out-of-road trajectories in the plurality of out-of-road trajectories, matching is performed on each of the three out-of-road trajectories to one another to acquire three match values. In a case that matching is to be performed on each of the out-of-road trajectories to one another, specifically, the matching may be performed on each of the out-of-road trajectories to one another in terms of at least one of direction, location and shape, to acquire the match values. The preset match threshold may be set according to practical conditions, and is not limited herein.

In a case that a match value is greater than a preset match threshold in the plurality of match values, the out-of-road trajectory corresponding to the match value is determined as a similar trajectory.

In a case that the number of the similar trajectories is greater than a preset number threshold, the out-of-road trajectories corresponding to the similar trajectories are fitted to acquire the fitting trajectory. The preset number threshold may be set according to the practical conditions, for example, 10, and is not limited herein.

In this embodiment, the fitting trajectory is acquired by firstly filtering the plurality of out-of-road trajectories and then fitting the selected out-of-road trajectories, so that the accuracy of the fitting trajectory is improved.

Figure 2:
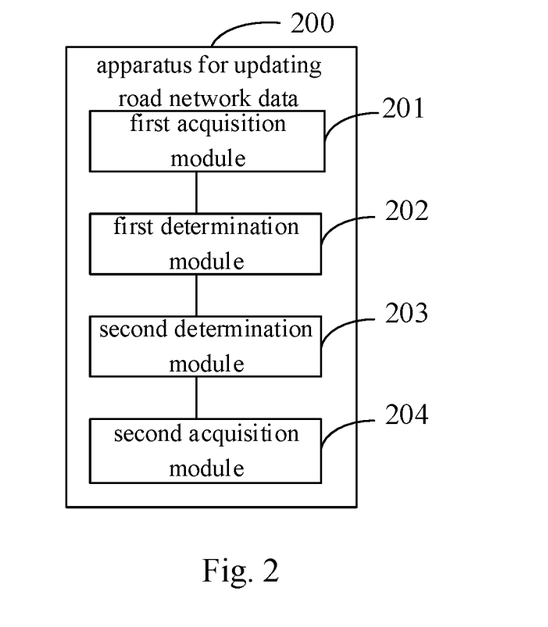
FIG. 2 is a schematic structural diagram of an apparatus for updating road network data according to an embodiment of the present disclosure.

Referring to FIG. 2, FIG. 2 is a schematic structural diagram of an apparatus for updating road network data according to an embodiment of the present disclosure. As shown in FIG. 2, an apparatus for updating road network data 200 provided in this embodiment includes: a first acquisition module 201, configured to acquire trajectory data reported by a terminal; a first determination module 202, configured to determine a plurality of out-of-road trajectories within a preset area coverage according to the trajectory data;

a second determination module 203, configured to determine a fitting trajectory according to the plurality of out-of-road trajectories; and a second acquisition module 204, configured to update existing first road network data according to the fitting trajectory to acquire second road network data.

In an embodiment of the disclosure, the second acquisition module 204 includes: a first matching submodule, configured to perform matching on the fitting trajectory and roads in the first road network data; a first acquisition submodule, configured to, in a case that there is no match between the fitting trajectory and the roads in the first road network data, acquire a first road point and a second road point in the first road network data, the first road point being a first road point in the first road network data which fails to match the fitting trajectory in a first direction, the second road point being a first road point in the first road network data which matches the fitting trajectory in the first direction, the first direction being a direction from a first end to a second end of the fitting trajectory; and an update submodule, configured to update the first road network data according to the first road point, the second road point and the fitting trajectory to acquire the second road network data.

In an embodiment of the disclosure, the first matching submodule is configured to: perform matching on the fitting trajectory and the roads in the first road network data in terms of direction; and/or, perform matching on the fitting trajectory and the roads in the first road network data in terms of location; and/or, perform matching on the fitting trajectory and the roads in the first road network data in terms of shape.

In an embodiment of the present disclosure, the road network data update apparatus further includes: a third acquisition module, configured to acquire a point of information POI in the preset area coverage; a third determination module, configured to determine whether the fitting trajectory is within a parking lot area or an internal road area according to the POI; and a trigger module, configured to, in a case that the fitting trajectory is not within a parking lot area or an internal road area, trigger the first matching submodule to operate.

In an embodiment of the present disclosure, the second determination module 203 includes: a second acquisition submodule, configured to perform matching on each out-of-road trajectory in the plurality of out-of-road trajectories to one another to acquire a plurality of match values; a determination submodule, configured to determine the out-of-road trajectories, corresponding to match values greater than a preset match threshold in the plurality of match values, as similar trajectories; and a third acquisition submodule, configured to, in a case that the number of the similar trajectories is greater than a preset number threshold, fit the out-of-road trajectories corresponding to the similar trajectories to acquire the fitting trajectory.

The apparatus for updating the road network data 200 is capable of implementing various processes implemented by the electronic device in the embodiment of the method shown in FIG. 1 and will not be described in detail herein in order to avoid repetition.

According to the apparatus for updating the road network data 200 in this embodiment of the present disclosure, trajectory data reported by a terminal is acquired; a plurality of out-of-road trajectories within a preset area coverage are determined according to the trajectory data; a fitting trajectory is determined according to the plurality of out-of-road trajectories; and existing first road network data is updated according to the fitting trajectory to acquire second road network data. The existing first road network data is updated as described above involving no manual work, so that the efficiency of the update of the first road network data is improved.

According to embodiments of the present disclosure, an electronic device and a readable storage medium are further provided.

Figure 3:
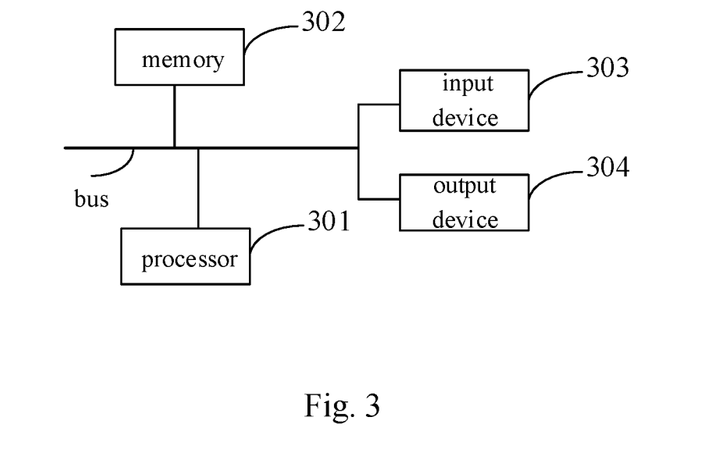
FIG. 3 is a block diagram of an electronic device for implementing the method for updating road network data according an embodiment of the present disclosure.

As shown in FIG. 3, a block diagram of an electronic device for implementing the method for updating the road network data according an embodiment of the present disclosure is shown. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistant, cellular telephones, smart phones, wearable devices, and other similar computing devices. The components shown herein, their connections and relationships, and their functions are by way of example only and are not intended to limit the implementations of the present disclosure described and/or claimed herein.

As shown in FIG. 3, the electronic device includes: one or more processors 301, a memory 302, and interfaces for connecting various components, including a high-speed interface and a low-speed interface. The various components are interconnected using different buses and may be mounted on a common motherboard or otherwise mounted as desired. The processors may process instructions for execution within the electronic device, including instructions stored in the memory or on the memory to display graphical information of GUI on an external input/output device, such as a display device coupled to the interface. In other embodiments, multiple processors and/or multiple buses may be used with multiple memories, if necessary. Also, multiple electronic devices may be connected, each providing some of the necessary operations (e.g., as an array of servers, a set of blade servers, or a multiprocessor system). In FIG. 3, an example of one processor 301 is illustrated.

The memory 302 is a non-transitory computer-readable storage medium provided herein. The memory has stored thereon instructions executable by the at least one processor to cause the at least one processor to perform the method for updating the network data in the present disclosure. The non-transitory computer-readable storage medium of the present disclosure has stored thereon computer instructions for causing a computer to perform the method for updating the network data in the present disclosure.

The memory 302, as a non-transitory computer-readable storage medium, may be used to store non-transitory software programs, non-transitory computer-executable programs, and modules, such as program instructions/modules (e.g., the first acquisition module 201, the first determination module 202, the second determination module 203, and the second acquisition module 204 shown in FIG. 2) corresponding to the method for updating the network data in the embodiments of the present the present. By running non-transitory software programs, instructions and modules stored in the memory 302, the processor 301 executes various functional applications and data processing of the server, i.e. implements the method for updating the network data in the method embodiment described above.

The memory 302 may include a program storage area and a data storage area, where the program storage area may store an operating system, and application programs for at least one function; and the data storage area may store data created according to the use of the electronic device implementing the method for updating the network data. In addition, the memory 302 may include a high speed random access memory, and may also include a non-transitory memory, such as at least one disk storage device, flash memory device, or other non-transitory solid state memory device. In some embodiments, the memory 302 may alternatively include a memory remotely located with respect to the processor 301, which may be connected via a network to the electronic device implementing the method for updating the network data. Examples of the network mentioned above include, but are not limited to, the Internet, intranets, local area networks, mobile communication networks, and combinations thereof.

The electronic device implementing the method for updating the network data may further include: an input device 303 and an output device 304. The processor 301, the memory 302, the input device 303, and the output device 304 may be connected to each other via a bus or in other ways. In FIG. 3, a bus for connection is taken as an example.

The input device 303 may receive input numeric or character information and generate key signal inputs related to user settings and functional controls of the electronic device implementing the method for updating the network data. For example, the input device may include a touch screen, a keypad, a mouse, a trackpad, a touch pad, a pointing stick, one or more mouse buttons, a trackball, a joystick, etc. The output device 304 may include a display device, an auxiliary lighting device (e.g., LED), a tactile feedback device (e.g., a vibration motor), etc. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuitry, integrated circuit systems, application-specific integrated circuits (ASICs), computer hardware, firmware, software, and/or combinations thereof. These various embodiments may include implementation in one or more computer programs that may be executed and/or interpreted on a programmable system including at least one programmable processor, which may be a dedicated or general purpose programmable processor, that may receive data and instructions from a storage system, at least one input device and at least one output device, and transmit the data and the instructions to the storage system, the at least one input device and the at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and techniques described herein may be implemented on a computer having: a display device (e.g., a cathode ray tube (CRT) or liquid crystal display (LCD) monitor) for displaying information to a user; and a keyboard and a pointing device (e.g., a mouse or a trackball) through which a user may provide input to the computer. Other types of devices may also be used to provide interaction with a user; for example, the feedback provided to the user may be any form of sensory feedback (e.g., visual feedback, auditory feedback, or tactile feedback); and input from the user may be received in any form, including acoustic input, voice input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or a computing system that includes any combination of such background components, middleware components, or front-end components. The components of the system may be interconnected by any form or medium of digital data communication (e.g., a communication network). Examples of communication networks include: Local Area Networks (LANs), Wide Area Networks (WANs), and the Internet.

The computer system may include a client and a server. The client and server are typically far away from each other and typically interact through a communication network.

The relationship of the client and the server is generated by computer programs running on respective computers and having a client-server relationship with each other.

According to the technical scheme of the embodiments of the present disclosure, trajectory data reported by a terminal is acquired; a plurality of out-of-road trajectories within a preset area coverage are determined according to the trajectory data; a fitting trajectory is determined according to the plurality of out-of-road trajectories; and existing first road network data is updated according to the fitting trajectory to acquire second road network data. The existing first road network data is updated as described above involving no manual work, so that the efficiency of the update of the first road network data is improved.

In a case that there is no match between the fitting trajectory and the roads in the first road network data, the first road point and the second road point in the first road network data are determined according to a relationship between the fitting trajectory and the roads in the first road network data, and then the first road network data is updated according to the first road point, the second road point and the fitting trajectory, so that the whole process of the update of the first road network involves no manual work, thereby improving the efficiency of update.

Matching is performed on the fitting trajectory and the roads in the first road network data in multiple ways to determine whether the fitting trajectory is a new trajectory, so that the first road network data may be updated according to the determined new trajectory, thereby improving the efficiency of the update of the first road network data.

A point of information POI within a preset area coverage is acquired, and then whether the fitting trajectory is within a parking lot area or an internal road area is determined according to the POI; and in a case that the fitting trajectory is not within the parking lot area or the internal road area, the matching on the fitting trajectory and the roads in the first road network data is performed, so that matching is performed on the fitting trajectory and the roads in the first road network data to update the first road network data only in a case that the fitting trajectory is not within the parking lot area or the internal road area, thereby improving the efficiency of the update of the first road network data.

The fitting trajectory is acquired by firstly filtering the plurality of out-of-road trajectories and then fitting the selected out-of-road trajectories, so that the accuracy of the fitting trajectory is improved.

It will be appreciated that the various forms of flows described above may be used, and the steps may be reordered, added or deleted. For example, the steps recited in the present disclosure may be performed in parallel or sequentially or may be performed in a different order, so long as the desired results of the technical solutions disclosed in the present disclosure can be achieved, and no limitation is made herein.

The above-described embodiments are not to be construed as limiting the scope of the present disclosure. It will be apparent to those skilled in the art that various modifications, combinations, sub-combinations and substitutions are possible based on design requirements and other factors. Any modifications, equivalents, and improvements within the spirit and principles of the present disclosure shall be included within the protection scope of the present disclosure.

What is claimed is:

1. A method for updating road network data, comprising:
   acquiring, by an electronic device, trajectory data reported by a terminal;
   determining, by the electronic device, a plurality of out-of-road trajectories within a preset area coverage according to the trajectory data;
   acquiring, by the electronic device, one fitting trajectory through fitting to the plurality of out-of-road trajectories;
   performing, by the electronic device, matching between the fitting trajectory and roads in an existing first road network data;
   in a case that there is no match between the fitting trajectory and the roads in the first road network data, acquiring, by the electronic device, a first road point in the first road network data and a second road point that is not located on an existing road in the first road network data, the first road point being a road point in the first road network data which fails to match the fitting trajectory in a first direction, the second road point being a second end of the fitting trajectory and not located on an existing road in the first road network data, the first direction being a direction from a first end to the second end of the fitting trajectory; and
   updating, by the electronic device, the first road network data according to the first road point, the second road point and the fitting trajectory to acquire the second road network data;
   wherein the method further comprises:
   acquiring, by the electronic device, a point of information POI in the preset area coverage;
   determining, by the electronic device, whether the fitting trajectory is within a parking lot area or an internal road area according to the POI; wherein the internal road area is an area comprising a non-public road; and
   in a case that the fitting trajectory is not within the parking lot area or the internal road area, performing, by the electronic device, the matching between the fitting trajectory and the roads in the first road network data.

2. The method for updating the road network data according to claim 1, wherein the performing matching between the fitting trajectory and roads in the first road network data, comprises:
   performing matching between the fitting trajectory and the roads in the first road network data in terms of direction;
   and/or,
   performing matching between the fitting trajectory and the roads in the first road network data in terms of location;
   and/or,
   performing matching between the fitting trajectory and the roads in the first road network data in terms of shape.

3. The method for updating the road network data according to claim 1, wherein the acquiring a fitting trajectory through fitting the plurality of out-of-road trajectories, comprises:
   performing matching between each out-of-road trajectory in the plurality of out-of-road trajectories to one another to acquire a plurality of match values;
   determining the out-of-road trajectories, corresponding to match values greater than a preset match threshold in the plurality of match values, as similar trajectories; and
   in a case that the number of the similar trajectories is greater than a preset number threshold, fitting the out-of-road trajectories corresponding to the similar trajectories to acquire the fitting trajectory.

4. An apparatus for updating road network data, comprising: a memory, a processor, and a computer program stored in the memory and executable by the processor, the processor is configured to execute the computer program to:
acquire trajectory data reported by a terminal;
determine a plurality of out-of-road trajectories within a preset area coverage according to the trajectory data;
acquire one fitting trajectory through fitting the plurality of out-of-road trajectories;
perform matching between the fitting trajectory and roads in an existing first road network data;
in a case that there is no match between the fitting trajectory and the roads in the first road network data, acquire a first road point and a second road point in the first road network data, the first road point being a road point in the first road network data which fails to match the fitting trajectory in a first direction, the second road point being a second end of the fitting trajectory and not located on an existing road in the first road network data, the first direction being a direction from a first end to a second end of the fitting trajectory; and
update the first road network data according to the first road point, the second road point and the fitting trajectory to acquire the second road network data;
wherein the processor is further configured to execute the computer program to:
acquire a point of information (POI) in the preset area coverage;
determine whether the fitting trajectory is within a parking lot area or an internal road area according to the POI; and
the processor is further configured to execute the computer program to in a case that the fitting trajectory is not within the parking lot area or the internal road area, performing the matching between the fitting trajectory and the roads in the first road network data.

5. The apparatus for updating the road network data according to claim 4, wherein the processor is further configured to execute the computer program to:
perform matching between the fitting trajectory and the roads in the first road network data in terms of direction;
and/or,
perform matching between the fitting trajectory and the roads in the first road network data in terms of location;
and/or,
perform matching between the fitting trajectory and the roads in the first road network data in terms of shape.

6. The apparatus for updating the road network data according to claim 4, wherein the processor is further configured to execute the computer program to:
perform matching between each out-of-road trajectory in the plurality of out-of-road trajectories to one another to acquire a plurality of match values;
determine the out-of-road trajectories, corresponding to match values greater than a preset match threshold in the plurality of match values, as similar trajectories; and
in a case that the number of the similar trajectories is greater than a preset number threshold, fit the out-of-road trajectories corresponding to the similar trajectories to acquire the fitting trajectory.

7. A non-transitory computer-readable storage medium having stored thereon instructions executable by a computer for causing the computer to:
acquire trajectory data reported by a terminal;
determine a plurality of out-of-road trajectories within a preset area coverage according to the trajectory data;
acquire one fitting trajectory through fitting to the plurality of out-of-road trajectories;
perform matching between the fitting trajectory and roads in an existing first road network data;
in a case that there is no match between the fitting trajectory and the roads in the first road network data, acquire a first road point and a second road point in the first road network data, the first road point being a first road point in the first road network data which fails to match the fitting trajectory in a first direction, the second road point being a second end of the fitting trajectory and not located on an existing road in the first road network data, the first direction being a direction from a first end to a second end of the fitting trajectory; and
update the first road network data according to the first road point, the second road point and the fitting trajectory to acquire the second road network data;
wherein the computer instruction is further used for causing the computer to:
acquire a point of information (POI) in the preset area coverage;
determine whether the fitting trajectory is within a parking lot area or an internal road area according to the POI; and
in a case that the fitting trajectory is not within the parking lot area or the internal road area, perform the matching between the fitting trajectory and the roads in the first road network data.

8. The non-transitory computer-readable storage medium according to claim 7, wherein the computer instruction is further used for causing the computer to:
perform matching between the fitting trajectory and the roads in the first road network data in terms of direction;
and/or,
perform matching between the fitting trajectory and the roads in the first road network data in terms of location;
and/or,
perform matching between the fitting trajectory and the roads in the first road network data in terms of shape.

9. The non-transitory computer-readable storage medium according to claim 7, wherein the computer instruction is further used for causing the computer to:
perform matching between each out-of-road trajectory in the plurality of out-of-road trajectories to one another to acquire a plurality of match values;
determine the out-of-road trajectories, corresponding to match values greater than a preset match threshold in the plurality of match values, as similar trajectories; and
in a case that the number of the similar trajectories is greater than a preset number threshold, fit the out-of-road trajectories corresponding to the similar trajectories to acquire the fitting trajectory.

* * * * *

UNITED STATES PATENT AND TRADEMARK OFFICE
CERTIFICATE OF CORRECTION

Page 1 of 1

PATENT NO. : 11,609,096 B2
APPLICATION NO. : 17/038516
DATED : March 21, 2023
INVENTOR(S) : Bing Li et al.

It is certified that error appears in the above-identified patent and that said Letters Patent is hereby corrected as shown below:

In the Claims

Claim 1, Column 12, Line 5: "acquiring, by the electronic device, one fitting trajectory fitting to the plurality of out-of-road trajectories;,". Should read --acquiring, by the electronic device, one fitting trajectory fitting the plurality of out-of-road trajectories;--

Signed and Sealed this
Sixteenth Day of May, 2023

Katherine Kelly Vidal
*Director of the United States Patent and Trademark Office*